United States Patent [19]

Groeneweg

[11] 4,309,725

[45] Jan. 5, 1982

[54] SIGNAL PROCESSOR FOR BEAM-SCAN VELOCITY MODULATION

[75] Inventor: Willem H. Groeneweg, Ottenbach, Switzerland

[73] Assignee: RCA Corporation, New York, N.Y.

[21] Appl. No.: 181,426

[22] Filed: Aug. 26, 1980

[30] Foreign Application Priority Data

Oct. 23, 1979 [GB] United Kingdom ............... 36746/79

[51] Int. Cl.³ ............................................. H04N 5/68
[52] U.S. Cl. ................................... 358/242; 358/166; 358/39; 358/64
[58] Field of Search .................. 358/242, 166, 64, 37, 358/39

[56] References Cited

U.S. PATENT DOCUMENTS

| | | | |
|---|---|---|---|
| 3,752,916 | 8/1973 | Lowry et al. | 358/242 |
| 4,170,785 | 10/1979 | Yoshida et al. | 358/242 |
| 4,183,064 | 1/1980 | Sahara et al. | 358/242 |
| 4,185,301 | 1/1980 | Mitsuda et al. | 358/242 |
| 4,197,558 | 4/1980 | Rutishauser | 358/39 |
| 4,261,014 | 4/1981 | Lee | 358/242 |

FOREIGN PATENT DOCUMENTS 1423434  2/1976  United Kingdom .

OTHER PUBLICATIONS

"25-V inch 114-Degree Trinitron Color Picture Tube and Associated New Developments", Yoshida et al., pp. 193-199 *IEEE Transactions* 8-74.

"Achievement of High Picture Quality in Color CRTs with the Beam-Scan Velocity Modulation Method" Yoshida et al., pp. 366-371, *IEEE Transactions on Consumer Electronics,* 8-77.

*Primary Examiner*—Richard Murray
*Attorney, Agent, or Firm*—Eugene M. Whitacre; Paul J. Rasmussen; William H. Meagher

[57] ABSTRACT

In a signal processor for a beam-scan velocity modulation system in a color TV receiver, a video signal derived from the receiver's luminance channel (or from a combination of the color signal inputs to the receiver's kinescope drivers) is applied to a CR differentiator. Differentiator output is applied to the base of a first transistor disposed with a second transistor to form a first differential amplifier, and to the base of a third transistor disposed with a fourth transistor to form a second differential amplifier. Common load circuit for double-ended limiter formed by the two amplifiers is coupled to collectors of third and fourth transistors. Base bias for second transistor is positively offset from common base bias for first and third transistors, while base bias for fourth transistor is negatively offset therefrom. Output stage of processor, responsive to voltage across common load circuit, drives auxiliary deflection coils via coupling capacitor, which exhibits series resonance with coils at frequency in midband of video signal frequency range.

7 Claims, 1 Drawing Figure

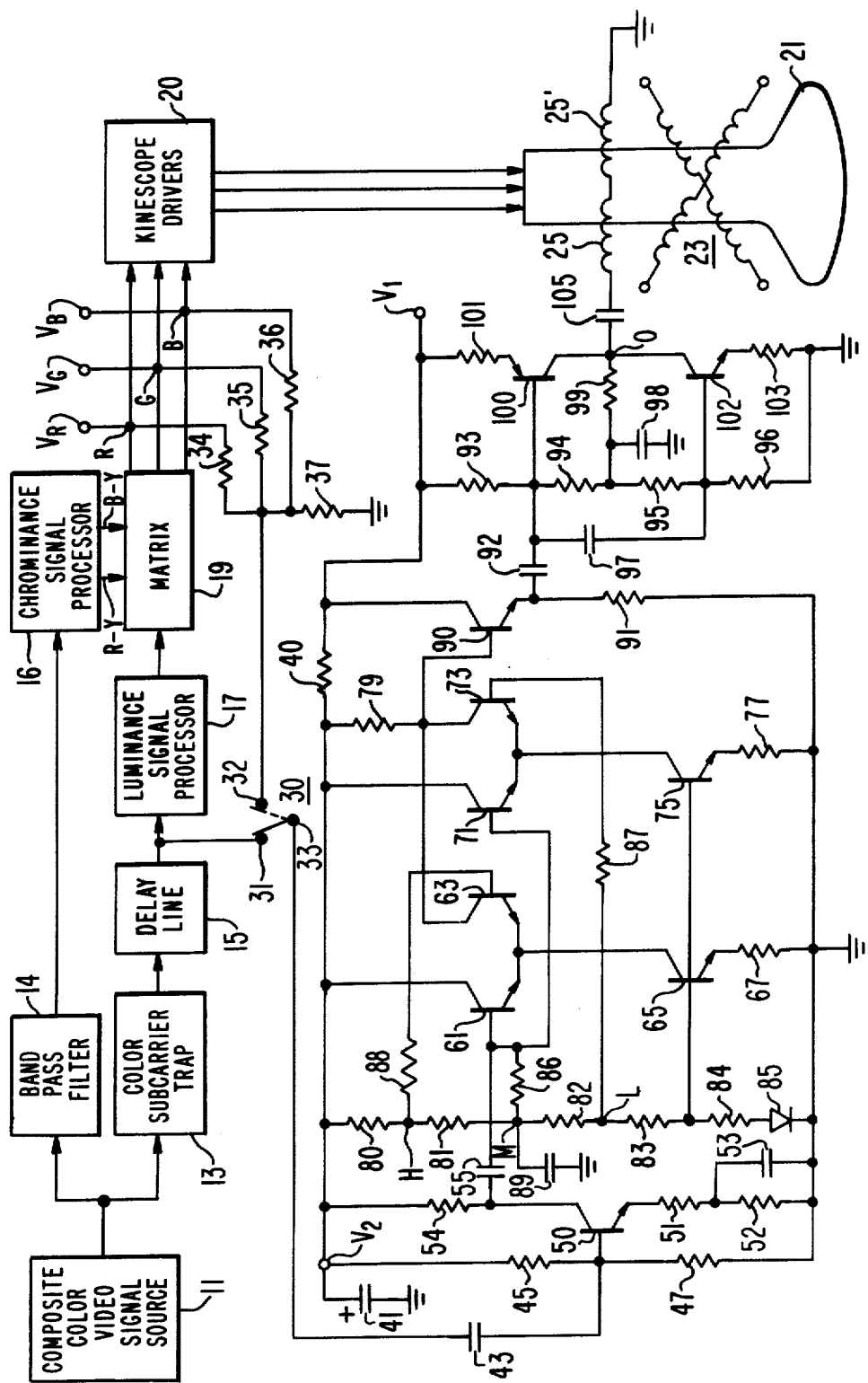

SIGNAL PROCESSOR FOR BEAM-SCAN VELOCITY MODULATION

The present invention relates generally to beam-scan velocity modulation systems employed for picture sharpness enhancemment, and particularly to novel and advantageous signal processors for such systems.

In the prior art, as described, for example, in an article by S. Yoshida, et al., in the August 1974 issue of IEEE Transactions BTR, pages 193-199, it is recognized that an improvement in apparent picture resolution is realizable by use of modulation of beam-scan velocity in accordance with the derivative of the video signal controlling the beam intensity. An advantage of this method over the peaking approach to picture sharpness enhancement is avoidance of blooming of peaked white picture elements.

When a simple differentiator circuit is employed to obtain the derivative of the beam intensity controlling video signal, it provides a high output for fast transients and a low output for slow transients. When the gain of the channel processing the derivative signal is chosen to provide the appropriate amount of supplemental beam deflection to achieve proper enhancement of a fast transient, the channel gain is insufficient to provide sharpness improvement for slow transients. When noise is present in the video signal subject to differentiation, the beam-scan velocity modulation system may undesirably enhance the visibility of such noise. Where the video signal subject to differentiation is derived from a composite color video signal, the presence of residual color subcarrier components in the input to the differentiator can undesirably result in enhanced visibility of a spurious dot structure.

In accordance with the principles of the present invention, the signal processor for a beam-scan velocity modulating signal subjects the output of a video signal differentiator to the action of a double-ended limiter incorporating a pair of threshold circuits so that the differentiated video signal is subject to both "coring" and "parting". The limiter develops a doubly clipped signal output, but does not respond to excursions of the differentiated signal of either polarity which lie below selected threshold magnitudes. The gain of the limiter is such as to ensure that sharpness enhancement is provided for slow transients, while the "paring" effects of the clipping action preclude association of excessive supplemental beam deflection with fast transients. The "coring" effects of the provision of the thresholds for the limiter significantly lessen the likelihood of noise visibility and subcarrier dot structure enhancement.

In accordance with an advantageous embodiment of the present invention, the double-ended limiter includes a first differential amplifier having first and second transistors with interconnected emitter electrodes, and a second differential amplifier having third and fourth transistors with interconnected emitter electrodes. The output of the video signal differentiator is supplied in common to the base electrodes of the first and third transistors, while a common output circuit is coupled to the collector electrodes of the second and fourth transistors. The respective base electrodes of the first and second transistors are differentially biased in such manner that the first transistor is cut off in the absence of signal input, while the respective base electrodes of the third and fourth transistors are differentially biased in such manner that the fourth transistor is cut off in the absence of the signal input.

Illustratively, the scanning velocity modulating means comprises a pair of printed auxiliary deflection coils encircling the neck of a color kinescope in the vicinity of the beam entrance end of a main deflection yoke, and the output of the double-ended limiter is supplied via a capacitor series coupled with the auxiliary deflection coils. The capacitor presents an impedance to horizontal flyback pulses (undesirably coupled to said auxiliary deflection coils from said yoke) which is sufficiently high to preclude pulse disturbance of the coil driver stage. Desirably, for improved auxiliary deflection sensitivity, the coupling capacitor and the auxiliary deflection coils exhibit series resonance at a video midband frequency (illustratively, between 1 and 2 MHz.)

In the accompanying drawing, the sole FIGURE illustrates, partially schematically and partially by a block diagram representation, an image display system incorporating a beam-scan velocity modulation system in accordance with an embodiment of the present invention.

In the drawing, a composite color video signal source 11 (which may, illustratively, comprise the video detector of a color television receiver) supplies a composite color video signal, including a wide band luminance signal component and a chrominance signal component in the form of modulated color subcarrier waves, to a band pass filter 14 and a color subcarrier trap 13. The band pass filter 14, having a pass band confined to a band of frequencies occupied by chrominance signal, supplies chrominance signal information to a chrominance signal processor 16. The chrominance signal processor 16 includes circuitry for deriving a pair of color-difference signals (e.g., R-Y and B-Y) from the received chrominance signal. The color difference signal outputs of processor 16 are supplied to a matrix 19.

The color subcarrier trap 13 has a rejection band centered about the frequency of the color subcarrier of the received chrominance signal. The output of the trap 13, comprising the luminance signal component of the composite signal, to the relative exclusion of the chrominance signal component which is strongly attenuated by the trap, is supplied via a delay line 15 to a luminance signal processor 17. The luminance signal output of processor 17 is supplied to matrix 19 for combination with the color-difference signal outputs of processor 16 to develop a trio of color signals (red, green and blue) at respective matrix output terminals R, G and B.

The signals developed at terminals R, G and B are supplied to kinescope drivers 20, which drive the respective red, green and blue electron guns of a color kinescope 21. Associated with color kinescope 21 is a main deflection yoke 23, comprising respective horizontal and vertical deflection windings, subject to energization by respective horizontal and vertical deflection circuits (not illustrated) to develop a raster of scanning lines on the viewing screen of the color kinescope 21. Supplemental deflection of the respective beams in the color kinescope 21 is effected by auxiliary deflection coils 25, 25', which encircle the neck of the color kinescope in the vicinity of the beam entrance end of the deflection yoke 23. Energization of the auxiliary deflection coils 25, 25' is provided by the output of circuitry now to be described.

In the apparatus of the drawing, an input selection switch 30 permits selection between alternative video signal sources for the input to the velocity modulating signal processor. Illustratively, input selection switch 30 is shown as a single-pole, double-throw switch. In one switch position (solid line showing in the drawing), the switch output terminal 33 is linked to switch input terminal 31, which is connected to receive the luminance signal output of delay line 15. In the alternative switch position (dotted-line showing in the drawing), switch output terminal 33 is linked to switch input terminal 32, which is connected to an alternative video signal source 10 to be described subsequently.

Switch output terminal 33 is coupled by capacitor 43 to the base electrode of an NPN transistor 50 disposed in a common-emitter amplifier configuration. The emitter of transistor 50 is returned to a point of reference potential (e.g., ground) via the series combination of resistors 51 and 52. Resistor 52 is by-passed by a capacitor 53.

The output of the input amplifier formed by transistor 50 appears across a load resistor 54 connected between the collector electrode of transistor 50 and a positive supply potential terminal $V_2$. A filter capacitor 41 is coupled between terminal $V_2$ and ground. Bias for the base of transistor 50 is derived from a voltage divider formed by resistors 45 and 47, connected in series between supply potential terminal $V_2$ and ground, with the base directly connected to the junction of resistors 45 and 47.

A capacitor 55 is coupled between the collector electrode of transistor 50 and the respective base electrodes of NPN transistors 61 and 71. Transistor 61 is disposed in a differential amplifier arrangement with NPN transistor 63, with the emitter electrodes of transistors 61 and 63 directly connected together. A substantially constant current source for the joined emitters is provided by an NPN transistor 65 having its collector electrode directly connected to the joined emitters of transistors 61 and 63, and with the emitter electrode of transistor 65 returned to ground via a resistor 67. Transistor 71 is disposed in a differential amplifier arrangement with NPN transistor 73, with the emitter electrodes of transistors 71 and 73 directly interconnected. A substantially constant current source for the interconnected emitters of transistors 71 and 73 is provided by NPN transistor 75, with its collector electrode directly connected to the interconnected emitters of transistors 71 and 73, and with the emitter electrode of transistor 75 returned to ground via a resistor 77.

The collector electrodes of transistor 61 and 71 are directly connected to the positive supply terminal $V_2$. A common output circuit for the two differential amplifiers is provided by a common load resistor 79 connected between terminal $V_2$ and the respective collector electrodes of transistors 63 and 73.

Biasing potentials for the base electrodes of transistors 61, 63, 65, 71, 73, 75 are supplied from a voltage divider formed by the series combination of resistors 80, 81, 82, 83, 84 and diode 85, serially connected in the order named between terminal $V_2$ and ground. A bias potential for the base electrode source transistors 65 and 75 is supplied via a direct connection between these base electrodes and the junction of divider resistors 83 and 84. A bias potential for the base electrodes of the respective input transistors (61, 71) of the two differential amplifiers is supplied via resistor 86 connected between these base electrodes and the junction (M) of divider resistors 81 and 82. A signal bypass to ground is provided by a capacitor 89 connected between junction M and ground. A bias potential, offset in the positive direction from the bias potential at junction M is supplied to the base electrode of transistor 63 via resistor 88 connected between that base electrode and the junction (H) of divider resistors 80 and 81. A bias potential, offset in the negative direction from the bias potential at junction M, is supplied to the base electrode 73 via a resistor 87 connected between that base electrode and the junction (L) of divider resistors 82 and 83.

The combined output of the two differential amplifiers, appearing at the joined collectors of transistors 63 and 73, is directly supplied to the base electrode of an NPN transistor 90 disposed in an emitter-follower configuration. The collector of transistor 90 is directly connected to a positive supply terminal $V_1$ (of higher positive potential then terminal $V_2$, to which it is linked by dropping resistor 40). The emitter-follower output appears across a resistor 91 connected between the emitter electrode of transistor 91 and ground.

A push-pull, complementary-symmetry output amplifier for the modulating signal channel employs a PNP transistor 100 and an NPN transistor 102, with the collector electrodes of transistors 100 and 102 jointly connected to an output terminal O. The emitter electrode of transistor 100 is connected to supply terminal $V_1$ via a resistor 101, while the emitter electrode of transistor 102 is returned to ground via a resistor 103.

Bias potentials for the base electrodes of output transistors 100 and 102 are derived from a voltage divider formed by the series combination of resistors 93, 94, 95 and 96, connected in the order named between terminal $V_1$ and ground. The base electrode of transistor 100 is directly connected to the junction of divider resistors 93 and 94, while the base electrode of transistor 102 is directly connected to the junction of divider resistors 95 and 96. The series combination of resistors 94 and 95 is by-passed for signals by a shunting capacitor 97 coupled between the respective output transistor base electrodes. A DC stabilizing feedback for the output transistors is provided via a common feedback resistor 99 connected between output terminal O and the junction of resistors 94 and 95, which junction is by-passed to ground for signal frequencies by a capacitor 98.

Signal input to the push-pull output amplifier stage is supplied via a capacitor 92 coupled between the emitter of transistor 90 and the base of transistor 100. The output of the modulating signal channel is supplied to a load formed by the series combination of a capacitor 105 and the serially connected auxiliary deflection windings 25, 25', the series combination being connected between the modulating signal channel output terminal O and ground.

In operation of the illustrated circuit, video signals amplified by transistor 50 are subject to differentiation by the CR circuit formed by capacitor 55 and resistor 86, with the differentiated output applied in common to the bases of transistors 61 and 71 of the respective differential amplifiers 61,63 and 71,73.

With the bias on the base of transistor 73 negatively offset relative to the bias on the base of transistor 71, transistor 73 is cut off in the absence of input signals. Transistor 73 remains in this cutoff condition during positive excursions of the differentiated signal, and thus differential amplifier 71,73 does not contribute signal variations to the limiter output during such positive excursions.

With the bias on the base of transistor 63 positively offset relative to the bias on the base of transistor 61, transistor 61 is cut off in the absence of input signals. Transistor 61 remains in this cut off condition during negative excursions of the differentiated signal, and thus differential amplifier 61,63 does not contribute signal variations to the limiter output during such negatiive excursions.

For a negative excursion of the differentiated signal to have an effect on the limiter output, it must be of sufficient magnitude to bring transistor 73 out of its normally cut off condition. Thus, the limiter does not respond to negative excursions of the differentiated signal of a magnitude below a threshold magnitude determined by the bias offset voltage developed across the bias divider resistor 82.

For a positive excursion of the differentiated signal to have an effect on the limiter output, it must be of sufficient magnitude to bring transistor 61 out of its normally cut off condition. Thus, the limiter does not respond to positive excursions of the differentiated signal of a magnitude below a threshold magnitude determined by the bias offset voltage developed across the bias divider resistor 81.

The circuit parameters for the input amplifier and the differential amplifiers are chosen so that the respective positive and negative signal swings of the differentiator output produced in response to video signal transients over a wide range of transient speeds are sufficient to drive the limiter output to respective clipping levels, whereby transients over said range produce the same magnitude of supplemental beam deflection. However, low amplitude noise components and residual color subcarrier components are removed by the "coring" effect of the threshold circuits of the limiter, precluding their undesired enhancement by the scan velocity modulating system.

The emitter-follower 90 couples the "pared" and "cored" output of the limiter to the output stage 100, 102 which supplies the desired scan velocity modulating current to the auxiliary deflection coils 25,25'.

Coupling of the output terminal O of the output stage to the auxiliary deflection coils 25,25' is effected via a coupling capacitor 105, with a capacitance value chosen to exhibit sufficient impedance to horizontal flyback pulses (which can be inductively coupled to the auxiliary deflection coils from the horizontal deflection windings of the main deflection yoke 23) to preclude significant disturbance of the output stage thereby. Desirably, this capacitance value is so related to the inductance value of the auxiliary deflection coils that series combination of capacitor 105 and the series-connected auxiliary deflection coils exhibits series resonance at a midband frequency location within the range of frequencies occupied by the video signal, easing drive requirements for the scan modulation system. As illustrative location for the frequency of resonance is between 1 and 2 MHz.

As an alternative to the above-discussed derivation of the input for the scan velocity modulation system from the luminance signal output of delay line 15, one may derive such input from a combination of the color signals used to drive the color kinescope. In the second (dotted line) position of input selection switch 30, such a source is relied upon. To provide such a combined color signal source, a trio of resistors 34, 35, 36 are respectively coupled between the respective matrix output terminals R, G and B and a common terminal which is returned to ground via a summing resistor 37. The common terminal is directly connected to the input terminal 32 of input selection switch 30. Where the receiver is provided with a set of color signal input terminals, such as $V_R$, $V_G$, and $V_B$ respectively connected to matrix output terminals, R, G and B, for input coupling to the display system of auxiliary color display information sources such as a teletext decoder, derivation of the input in the latter manner permits sharpness enhancement during such auxiliary modes of receiver operation.

Set forth in the table below are parameter values which provided satisfactory operation of an illustrative embodiment of the present invention:

| | |
|---|---|
| Capacitor 41 | 100 microfarads |
| Capacitor 43 | 1 nanofarad |
| Capacitor 53 | .1 microfarad |
| Capacitor 55 | 39 picofarads |
| Capacitor 89 | .1 microfarad |
| Capacitor 92 | 470 micromicrofarads |
| Capacitor 97 | 47 nanofarads |
| Capacitor 98 | .1 microfarad |
| Capacitor 105 | 3.3 nanofarads |
| Resistors 34,35,36 | 6.8 kilohms |
| Resistor 37 | 1 kilohm |
| Resistor 40 | 330 ohms |
| Resistor 45 | 39 kilohms |
| Resistor 47 | 22 kilohms |
| Resistor 51 | 100 ohms |
| Resistor 52 | 470 ohms |
| Resistor 54 | 560 ohms |
| Resistors 67,77 | 270 ohms |
| Resistor 79 | 820 ohms |
| Resistor 80 | 4.7 kilohms |
| Resistor 81 | 68 ohms |
| Resistor 82 | 56 ohms |
| Resistor 83 | 1.5 kilohms |
| Resistor 84 | 680 ohms |
| Resistor 86 | 680 ohms |
| Resistors 87,88 | 1.2 kilohms |
| Resistors 93,96 | 1 kilohm |
| Resistors 94,95 | 18 kilohms |
| Resistor 99 | 470 ohms |
| Resistors 101,103 | 10 ohms |
| Transistors 61,63,65, 71,73,75 | Type CA 3102 IC |
| Transistor 101 | Type BC 327-25 |
| Transistor 102 | Type BC 337-25 |
| Potential $V_1$ | +30 volts |
| Potential $V_2$ | +15 volts |

In use of said illustrative embodiment, the inductance exhibited by the series combination of auxiliary deflection coils 25,25' was 5 microhenries. The auxiliary coils comprised of a pair of 7-turn copper coils printed on a common mylar substrate of 100 micrometer thickness, 94 millimeter length, and 20 millimeter width, with copper line thickness of 35 micrometers, copper line width of 0.5 millimeter, and copper line spacing width of 0.25 millimeter.

What is claimed is:

1. In an image display system, including a source of image-representative signals; an image display device having a display screen and an electron gun assembly for directing at least one beam of electrons toward said display screen; means for effecting beam deflection in a manner causing said beam of electrons to repetitively trace a raster of scanning lines on said display screen; and means for modulating the velocity of scanning of said lines; apparatus comprising the combination of:
    means coupled to said source for differentiating said image-representative signals;
    double-ended limiter means, responsive to the differentiated signal output of said differentiating means, for developing a clipped signal output in which output signal excursions in one direction are clipped at a first predetermined level and output signal excursions in the opposite direction are clipped at a second predetermined level; said limiter means including first threshold establishing means for precluding said limiter means from responding to excursions of said differentiated signal of a first polarity and of a magnitude below a first threshold magnitude, and second threshold establishing means for precluding said limiter means from responding to excursions of said differentiated signal of a second polarity and of a magnitude below a second threshold magnitude; and means for supplying said clipped signal output to said scanning velocity modulating means.

2. Apparatus in accordance with claim 1 wherein said limiter means comprises:

a first differential amplifier including first and second transistors, each having base, emitter and collector electrodes, a current source coupled to the emitter electrodes of said first and second transistors, and means for applying said differentiated signal output of said differentiating means to the base electrode of said first transistor;

a second differential amplifier including third and fourth transistors, each having base, emitter and collector electrodes, a current source coupled to the emitter electrodes of said third and fourth transistors, and means for applying said differentiated signal output of said differentiating means to the base electrode of said third transistor;

a common output circuit coupled to the collector electrodes of said second and fourth transistors;

wherein said first threshold establishing means comprises means for differentially biasing the respective base electrodes of said first and second transistors in such manner that said first transistor is cut off in the absence of said image-representative signals; and wherein said second threshold establishing means comprises means for differentially biasing the respective base electrodes of said third and fourth transistors in such manner that said fourth transistor is cut off in the absence of said image-representative signals.

3. Apparatus in accordance with claim 2 including a source of bias potential, a voltage divider coupled across said bias potential source and having an intermediate tap, a first voltage takeoff terminal offset from said intermediate tap in a first sense, and a second voltage takeoff terminal offset from said intermediate tap in a second sense opposite to said first sense;

wherein said first-named biasing means comprises a direct current conductive connection between the base electrode of said first transistor and said intermediate tap, and a direct current conductive connection between the base electrode of said second transistor and said first voltage takeoff terminal; and wherein said second-named biasing means comprises a direct current conductive connection between the base electrode of said third transistor and said intermediate tap, and a direct current conductive connection between the base electrode of said fourth transistor and said second voltage takeoff terminal.

4. Apparatus in accordance with claims 1 or 2, wherein said image display device comprises a kinescope having a neck enclosing said electron gun assembly, wherein said beam deflection effecting means comprises a deflection yoke encircling said kinescope neck, wherein said scanning velocity modulating means comprises a pair of auxiliary deflection coils encircling said neck in the vicinity of the beam entrance end of deflection yoke, and wherein said supplying means comprises a capacitor serially coupled with said auxiliary deflection coils.

5. Apparatus in accordance with claim 4 wherein said deflection yoke includes horizontal deflection windings across which appear flyback pulses recurring at the repetition rate of said scanning lines, wherein said auxiliary deflection coils are realized in printed circuit form on a common substrate of insulating material, and wherein said capacitor presents a high impedance to flyback pulses of said repetition rate.

6. Apparatus in accordance with claim 5 wherein said image-representative signals occupy a given band of frequencies, and wherein said capacitor and said auxiliary deflection coils exhibit series resonance at a frequency lying within said given band of frequencies.

7. Apparatus in accordance with claim 6 wherein said frequency at which said series resonance is exhibited lies between 1 and 2 MHz.

* * * * *